United States Patent [19]

Hardy

[11] Patent Number: 4,527,013
[45] Date of Patent: Jul. 2, 1985

[54] TELEPHONE ANSWERING SYSTEM

[76] Inventor: Wayne R. Hardy, 55 Selwyn Pl., Kanata, Ontario, Canada, K2K 1P1

[21] Appl. No.: 426,214

[22] Filed: Sep. 28, 1982

[51] Int. Cl.³ ............................................. H04M 3/50
[52] U.S. Cl. ............................................. 179/27 FH
[58] Field of Search ......... 179/27 FH, 18 BE, 18 ES, 179/5.5

[56] References Cited

U.S. PATENT DOCUMENTS

| | | | |
|---|---|---|---|
| 4,117,270 | 9/1978 | Lesea | 179/18 BE |
| 4,256,928 | 3/1981 | Lesea et al. | 179/18 BE |
| 4,401,856 | 8/1983 | Curtin et al. | 179/27 FH |
| 4,412,101 | 10/1983 | Brown et al. | 179/7.1 R |

Primary Examiner—Thomas W. Brown
Attorney, Agent, or Firm—Achmed N. Sadik

[57] ABSTRACT

A telephone answering system is disclosed capable of accommodating geographically dispersed customer stations and obviating the need for any dedicated concentrators or distributors. The TAS bureau comprises a plurality of stations each having access to two telephone lines, with the whole bureau having a single access number. The customer station has full control over the mode of service desired at any given time, and a modem in the customer station communicates necessary information as needed to its counterpart in the TAS station.

7 Claims, 5 Drawing Figures

TELEPHONE ANSWERING SYSTEM

FIELD OF THE INVENTION

The present invention relates to systems for Telephone Answering Services (TAS) in general and particularly to a novel system having geographically distributed control, and not requiring any concentrators.

BACKGROUND AND PRIOR ART OF THE INVENTION

Providers of telephone answering services accept calls directed to their customers by others. In many instances, the service is provided by bridges to TAS customers' lines at the nearest telephone company (TELCO) switching centre that are extended to appear at an operator position at the TAS premises. Incoming calls to customers ring also at the TAS operator position. The customer telephones the TAS operator with instructions to commence or cease answering.

Depending on the traffic pattern of customer calls, an operator position may be required to handle up to 100 customers. As a TAS office normally has several operator positions, it is necessary to place these positions in proximity, on order that a vacant position be answered by a neigbouring operator. Otherwise concentrators and call distributors would be necessary.

A typical modern system called AUTOTAS TM is sold by Candela Electronics, Inc. of Sunnyvale, Calif., U.S.A. This system may handle up to 1000 customers by concentrating them into 29 trunks that are then distributed to 6 operator positions. The system is centralized, microprocessor controlled, and has several desirable features for the TAS bureaus.

U.S. Pat. No. 4,328,396 granted to Peter F. Theis on May 4, 1982, provides a telephone answering system including answering machines, for carrying on a programmed telephone conversation with a respondent, having an interface with the telephone line, and a control for altering the course of the programmed conversation when a disconnect signal is passed by the interface. The system contemplates serving a multiplicity of incoming telephone calls with a number of line operator stations, with the capability of overflow calls being handled by the answering machines. The system also includes a concentrator which continuously sweeps the incoming telephones lines to select any line having an unanswered call, continuously sweeps the answering machines to identify an available machine, and then effects a connection between the selected telephone line and the available machine.

U.S. Pat. No. 4,302,632 granted to Ronald P. Vicari et al on Nov. 24, 1981 provides a digitally controlled telephone answering switching system, which is capable of serving a large number of subscribers over a vast geographic area. The system utilizes a plurality of remote sites each of which is adjacent to a telephone company central office and which includes a trunk concentrator to reduce the number of trunk lines required to service the subscribers. A central site of this answering system serves as a facility to answer calls relayed through the remote sites. It includes a concentrator to further reduce the number of lines to operator positions. A computer at the central site controls the entire system, determines switching paths through the concentrators from a subscriber line to an operator, furnishes answering information to operators and stores instructions for answering incoming messages. The logic of the system permits any operator to answer any incoming telephone call on any subscriber line promptly, economically and correctly.

In addition, U.S. Pat. No. 4,200,772 also granted to Ronald P. Vicari et al on Apr. 29, 1980, provides in the system a line scanner which counts rings on an incoming line to determine whether it should be answered, and an arrangement in the control computer for controlling coupling of a signal on a line to be answered to a selected operator position having a visual display, to which is transmitted data relative to the subscriber associated with a call to be answered by the selected operator position.

In an earlier U.S. Pat. No. 3,637,947 granted to Charles Breen on Jan. 25, 1972, telephone answering service is provided by modifying a central office (switching centre) at the telephone company by the addition of an auxilliary switching network upon which are terminated telephone answering board incoming trunks and call forwarding trunks. These trunks also appear at respective remote telephone answering switchboards and each has a line circuit appearance in the main switching network. The system is arranged so that an incoming connection via a telephone answering board incoming trunk may be extended to a remote destination via a selected call forwarding trunk under control of the telephone answering board. A controller circuit associated with the auxilliary switching network is responsive to control signals from the remote telephone answering switchboard to enable a connection between the activated telephone answering board incoming trunk and the selected call forwarding trunk via the auxilliary switching network located at the central office.

Common among all of the above systems are two main features:
- auxilliary switching or concentration, in addition to telephone company facilities; and
- central control of the total system.

In essence, a parallel, centralized telephone switching system is created for each TAS bureau.

SUMMARY OF THE INVENTION

The present invention endeavours to eliminate TAS concentrators; and to provide more distributed control throughout the system, in order to give the TAS customer more flexibility while mitigating susceptibility to inadvertent misuse.

It is thus an object of the present invention to provide a versatile TAS system, wherein each customer has immediate and direct control over the mode of service desired by her or him at any particular time.

It is another object of the present invention to mitigate TAS bureaus' dependance on such parameters as proximity to their customers, or to telephone company switching centres.

A feature of the present invention is that the TAS customer information is stored in the customer stateion and is transmitted to the TAS bureau every time a call is to be answered for the customer.

Another feature is the utilization by the present invention of the existing telephone company equipment in order to eliminate dedicated TAS concentrators.

In particular, the present invention utilizes to the fullest the capability of telephone companies to provide telephone lines with hunting to the TAS bureau at many locations.

A pronounced advantage of the present invention is that a TAS system may be expended from a single operator position with only proportional investment in equipment as the number of customers grows.

Another important advantage is that geographically dispersed customers may be served from a single TAS bureau. This would be particularly useful, for example, to a company with dispersed sales offices, whereby it can provide its own TAS bureau from any of its locations.

Thus, according to the present invention, a system for telephone answering service (TAS) is provided, for a plurality of customer stations each having access to first and second telephone lines, wherein a TAS station comprises: TAS storage and control means; at least one TAS operator position; at least two incoming telephone lines; switch means for selectively connecting one of said two incoming telephone lines to said operator position and to interface means with said TAS storage and control means; and display means at said TAS operator position responsive to said local storage and control means for displaying data relayed over said second telephone line to said TAS station.

Flexibility is provided to the customer by locating control over her or his TAS answering data and/or information at her or his premises and relaying them for display at the operator position each time a call is to be answered. By using a modem at the customer station to communicate initially with the microprocessor of the TAS station ensures tamper-proof data exchange.

Normally a mature TAS bureau services several hundred customers with few TAS operator positions. By assigning a single telephone number to the TAS bureau, i.e. by asking the telephone company serving the TAS bureau to provide all its telephone lines with hunting, a TAS concentrator and/or call distributor are dispensed with. Since the function of TELCO switching centres is to concentrate as well as to switch, efficient use is thus made of already existing devices and performed functions without detriment thereto.

Should the customers of the TAS bureau be geographically dispersed as to require the DDD-network, the appropriate access codes (area code, zenith code, or the line) would be stored in the customer station. Indeed, because the particular TAS answering information is transmitted each time, the particular individual's telephone could be answered by TAS operator according to the individual's exact requirement. This is the case in DID (Direct-Inward-Dialing) systems, which, however, are often available only in large blocks of 100 or 1000 numbers, if at all; (in DID systems a receptionist is not normally able to answer an incoming call by identifying the individual by name, since only four digits identify his particular station).

Thus, according to the present invention, a customer station comprises: local storage and control means; a modem responsive to said local storage and control means connected to a second telephone line; a ringing detector connected to a first telephone line; interconnect means responsive to the local storage and control means for establishing at least a voice band connection between first and second telephone lines in response to ringing on first line and an off-hook state at the TAS operator position; and data entry means for instructing said local storage and control means.

BRIEF DESCRIPTION OF THE DRAWINGS

A preferred embodiment will now be described in conjunction with the accompanying drawings, in which.

DETAILED DESCRIPTION OF THE PREFERRED EMBODIMENT

Figure 1:
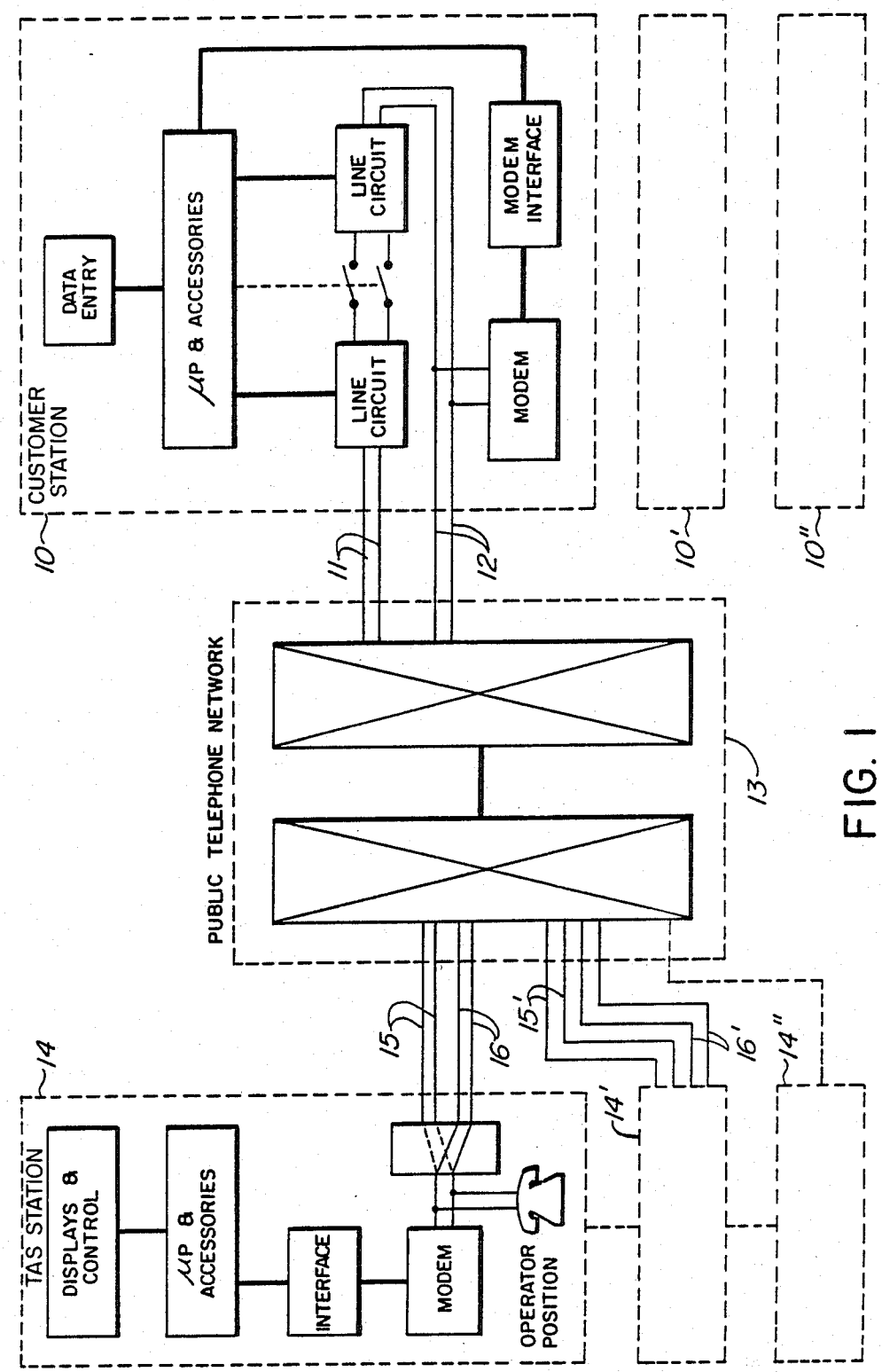
FIG. 1 is a block diagram showing the overall organization of a telephone answering system in accordance with the present invention.

Referring now to FIG. 1 of the drawings, a TAS system according to the present invention comprises a plurality of customer stations 10, 10', 10'', etc., that may or may not be geographically widely dispersed, each having access to first and second telephone lines 11 and 12, respectively, which are connected to the TELCO's, or other, switching network 13. On the TAS bureau side, a plurality of TAS stations 14, 14', 14'', etc., are each connected to the switching network by two telephone lines 15 and 16, 15' and 16', and so forth, respectively; all of the TAS telephone lines being accessible through the switching network by a single telephone number. Such groups of incoming telephone lines are termed lines with "hunting", meaning that if the first line (15) is busy, the next numbered line rings although its unique number has not been dialed. Note that the next numbered line need not be line 16, for, in order to distribute the load of incoming calls more evenly, it is opportune to associate the first line with the last line in the hierarchy (if a hierarchy exists among the lines supplied by the TELCO), the second line with the one before last, and so on.

Figure 2:
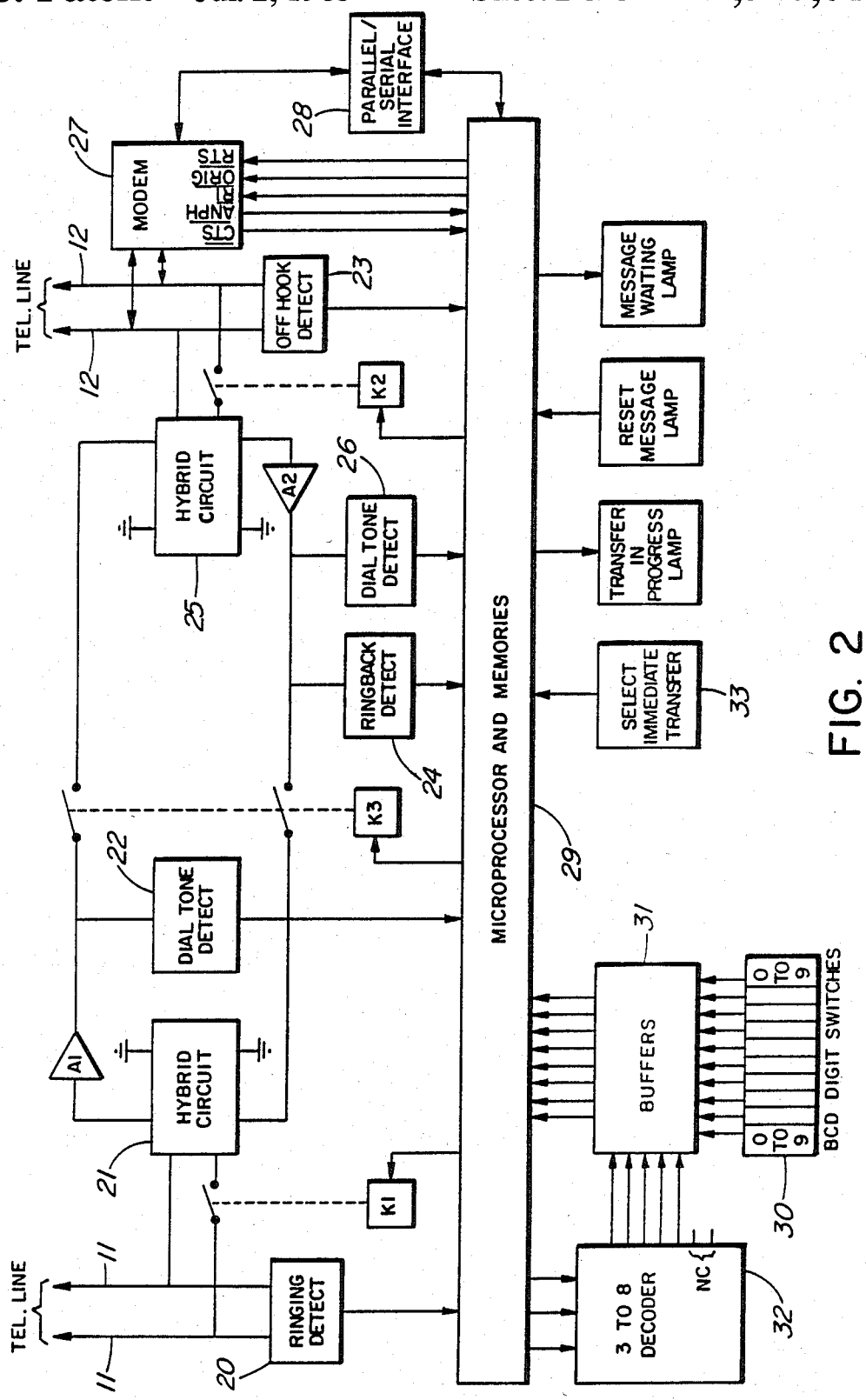
FIG. 2 is a block schematic of one of the customer stations shown in FIG. 1.

Turning now to FIG. 2 of the drawings, the customer station 10 comprises a ringing detector 20 to detect ringing on the first telephone line 11, an on/off hook relay K1, a hybrid circuit 21, voice amplifier A1 and dial-tone detector 22, all of which are associated with the first line 11. Associated with the second line 12, are: an off-hook detector 23, and a ring-back detector 24, in addition to hybrid 25, dial-tone detector 26, and voice amplifier A2. In addition, a MODEM 27 (modulator-demodulator) is connected in parallel to the second line 12, and accesses it without disrupting its operation, i.e. with a high impedance. The MODEM 27 communicates via parallel/serial interface register 28 with a microprocessor module 29, which controls the customer station 10. The microprocessor module 29 senses the outputs of the ringing detector 20, the dial-tone detectors 22 and 26, the ring-back detector 24, the off-hook detector 23, as well as the $\overline{\text{CTS}}$ (Clear-to-send) and $\overline{\text{ANPH}}$ (answer-phone) of the MODEM 27. The microprocessor module 29 controls: the operation of the MODEM 27 via its terminals $\overline{\text{RI}}$ (ring), $\overline{\text{ORIG}}$ (originate) and $\overline{\text{RTS}}$ (request-to-send); the on-off hook relay K2; and a first/second lines interconnect relay K3, which establishes the actual voice connection between a TAS operator and the party that dialed the TAS customer's number. The customer station 10 also comprises eleven BCD (binary coded decimal) thumbwheel switches 30 each being set to a digit from 0 to 9 corresponding to the full TAS bureau access number. The switches are sensed by buffers 31, which access the microprocessor module 29, and which are controlled by 3-to-8 decoder 32 decoding instructions from the module 29. Thus, depending on the geographical location of the customer, the appropriate digits (area code, zenith code, TAS telephone number, etc.) are selected. A TAS customer may select immediate transfer upon ringing detection by activating a switch 33.

Figure 3:
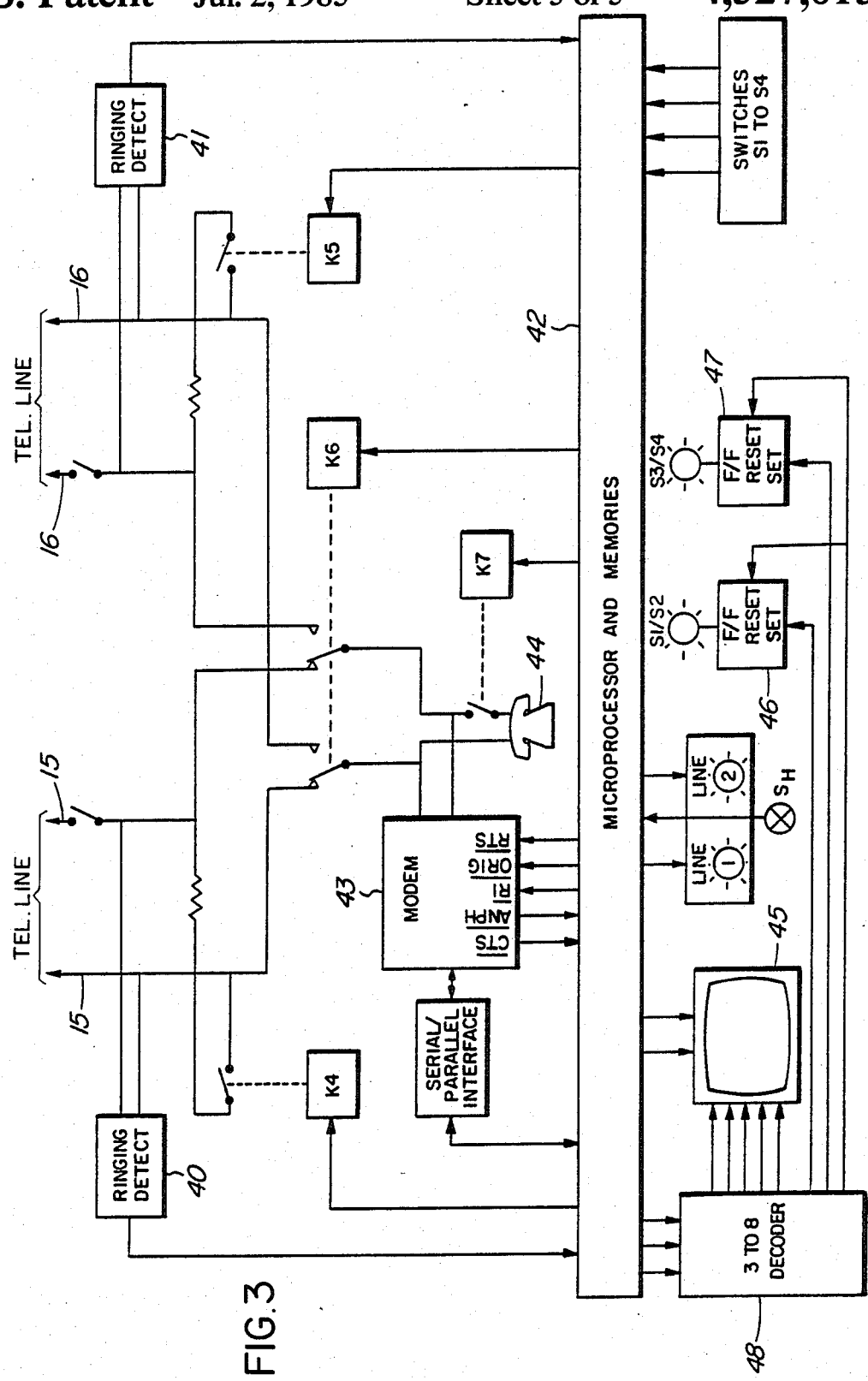
FIG. 3 is a block schematic of one of the TAS stations shown in FIG. 1.

Turning now to FIG. 3, the TAS station 14 comprises ringing detectors 40 and 41, hold-relays K4 and K5, one for each of the lines 15 and 16. A relay K6 is controlled by microprocessor module 42 to connect either of the lines 15 and 16 to a MODEM 43, which is identical to the MODEM 27 in the customer station 10 of FIG. 2. A telephone connect relay K7 connects the operator position (i.e. telephone) 44 to complete the voice connection. The TAS operator has a CRT display 45 and switch activation indicators 46 and 47, all of which are controlled by a 3-to-8 decoder 48 from the microprocessor module 42. Switches S1 to S4 enable the operator to answer a line, or transmit instructions to the customer unit. Each of the lines 15 and 16 has a lamp associated with it, and a line hold switch $S_H$, similar to a key-telephone set.

The operation of the system will now be described in detail with particular reference, in addition to FIGS. 1, 2 and 3, to the flow charts in FIGS. 4 and 5.

OPERATION

Figure 4:
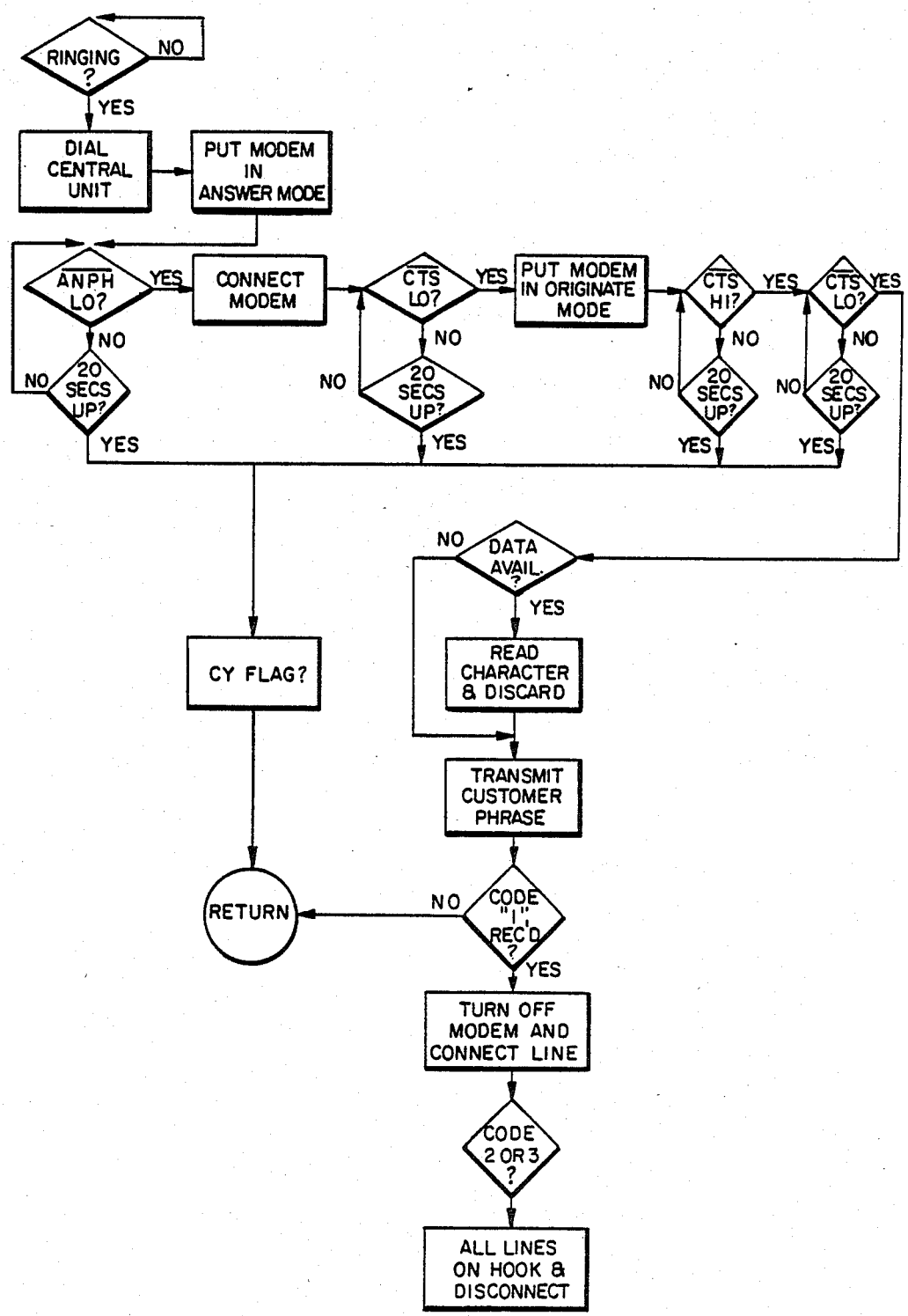
FIG. 4 is a flow chart explaining operational sequences of the customer stations shown in FIG. 2.

With reference now to FIGS. 2 and 4, at the customer station 10, ringing on the first telephone line 11 is detected by the ring detector 20. If the switch 33 is in the immediate transfer position the relay K2 connected to the second line 12 is operated to place that line in the off-hook mode. 70 milliseconds following the detection of dial tone by dial-tone detector 26, the relay K2 outpulses all the digits of the telephone number stored in memory except for the final digit. This digit is outpulsed during the next ringing pulse on the first line 11. If the ringing pulse is not received within 6 seconds, the second line 12 is returned to the on-hook state. If the switch 33 is in the other position the second line 12 remains in the on-hook state for 20 seconds before initiating the above dialing sequence.

Following completion of the dialing sequence, the MODEM 27 is switched from its idle mode to its answer mode by the simultaneous placement of logic ZEROs at its $\overline{RTS}$ and $\overline{RI}$ terminals. Following the ensuing transition of the $\overline{ANPH}$ status lead to logic ZERO, indicating that the MODEM 27 is now in the answer mode, the MODEM 27 is connected to the second line 12 by means of an internal relay and transmits its carrier frequency associated with the answer mode.

Figure 5:
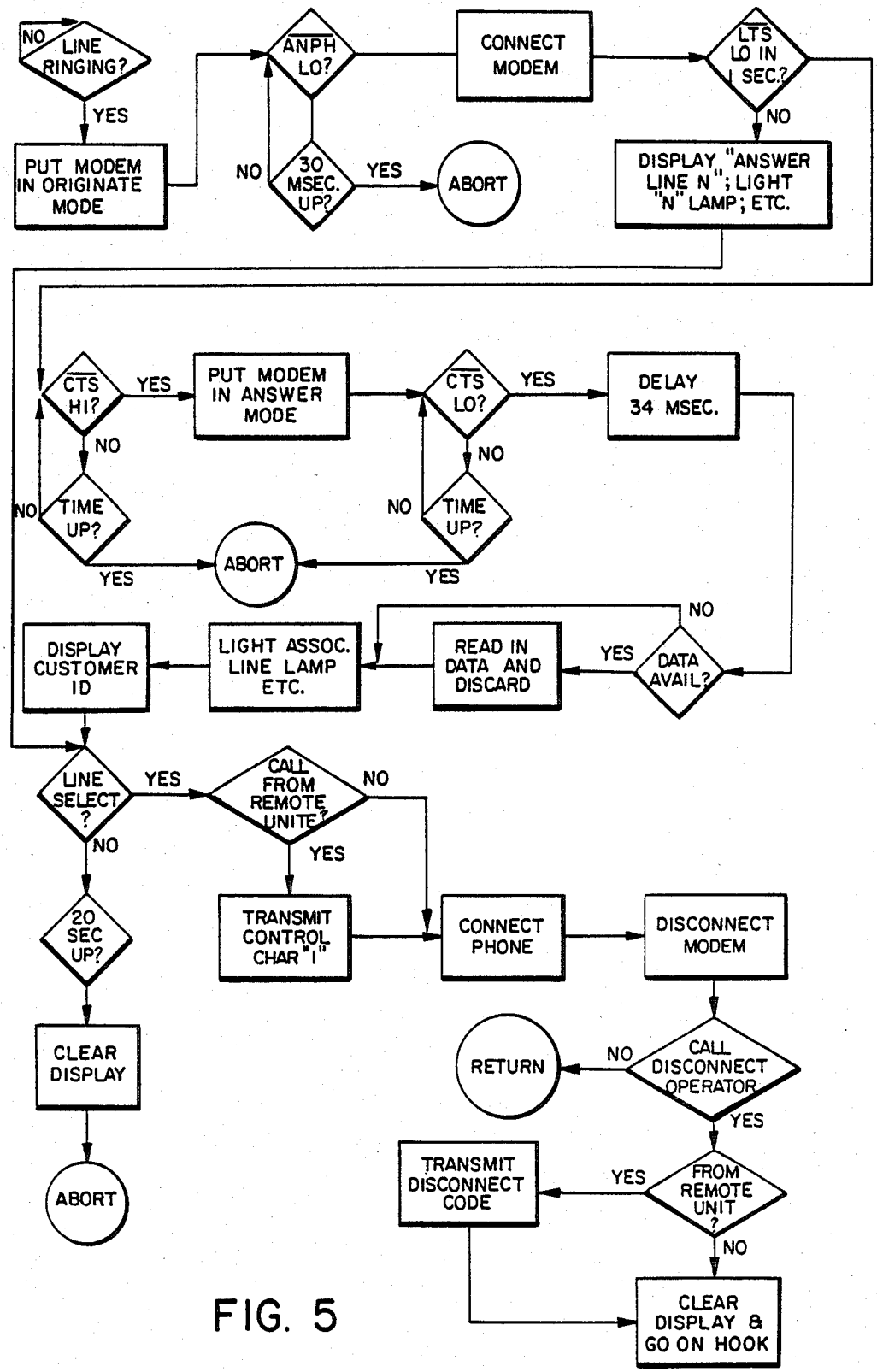
FIG. 5 is a flow chart explaining operational sequences of the TAS stations shown in FIG. 3.

Referring to FIGS. 3 and 5, at the TAS station 14 the MODEM 43 is initially in its idle mode. When incoming ringing is detected by the ring detector 40 associated with the telephone line 15, the MODEM 43 is placed into its originate mode by the simultaneous placement of logic ZEROs at its $\overline{RTS}$ and $\overline{ORIG}$ terminals. When the $\overline{ANPH}$ status changes to ZERO the MODEM 43 is in its originate mode and is then connected to the telephone line 15, on which ringing was detected, via the relay K6. This places the TAS station 14 in the off-hook state, thus causing ringing from the switching network 13 to stop.

The MODEM 43, being in its originate mode, is now able to detect the carrier frequency transmitted by the MODEM 27 which is in the answer mode. Reception of this carrier causes the MODEM 43 to initiate transmission of its own carrier frequency and to activate its $\overline{CTS}$ terminal with a logic ZERO. This transition of the $\overline{CTS}$ terminal indicates to the microprocessor module 42 that the call being processed is from a customer station. If this transition does not occur within one second of activation of the MODEM 43, the incoming call is identified as originating directly from an ordinary telephone, and is so identified on the CRT display 45.

The carrier frequency being transmitted by the MODEM 43 is detected by the MODEM 27, causing its $\overline{CTS}$ terminal lead to change to a logic L0 state. In order to ensure reliability and security of the system, on detection of this transition of the $\overline{CTS}$ terminal status, the MODEM 43 is changed from the answer mode to the originate mode by means of simultaneous ZEROs on the $\overline{RTS}$ and $\overline{ORIG}$ terminals. Since both MODEMS 27 and 43 are now in their originate mode, their $\overline{CTS}$ terminals show logic HI. Following this $\overline{CTS}$ transition at the MODEM 43, the $\overline{RTS}$ and $\overline{RI}$ terminals are simultaneously activated with a ZERO state, causing the MODEM 43 to switch into the answer mode. This causes a $\overline{CTS}$ transition to the L0 state at both MODEMS 27 and 43, indicating that reception and transmission of data is now possible. The receive buffer in each MODEM will either be empty or contain an arbitrary character, since valid data has not yet been transmitted. The availability of data is checked at each of the MODEMS 27 and 43, and if the answer is yes, the arbitrary characters are read and discarded.

Upon completion of the initial procedure, the customer identification phrase, stored in the microprocessor module 29, is transmitted to the MODEM 43. When this data is available, the first character of the identification phrase is stored in a buffer, and subsequently is read by the microprocessor module 42. This process continues until all customer identification characters have been received and stored. This customer identification phrase is then displayed on the CRT 45, and the associated line lamp is lighted.

The operator then activates the line switch associated with this call, which causes a control character to be transmitted by the MODEM 43, and the operator's telephone 44 to be connected by means of the relay K7. Receipt of this control character by the MODEM 27 causes it to go in the idle state ($\overline{RTS}$, $\overline{ORIG}$, $\overline{RI}$ all HI) while remaining connected to the second telephone line 12. This control character also causes the first telephone line 11 to be placed in the off-hook mode by means of the relay K1, and a voice path connection between the two lines 11 and 12 is established by means of the relay K3. The operator at the TAS station 14 and the caller now converse.

On completion of this conversation, the MODEM 43 is placed in the answer mode ($\overline{RTS}$ and $\overline{RI}$ ZERO). The MODEM 43 then transmits its carrier, which is received by the MODEM 27. The MODEM 43 then transmits the appropriate control character as selected by the operator (e.g. "message") by activating one of the switches S1 to S4. The MODEM 43 is then disconnected and the TAS station goes on-hook. The display is also cleared and the MODEM 43 is placed in the idle state ($\overline{RTS}$, $\overline{RI}$, $\overline{ORIG}$ all HI) in preparation for accepting another call. Receipt of the control character by the MODEM 27 causes the two lines 11 and 12 to go on-hook, places the MODEM 27 in the idle state ($\overline{RTS}$, $\overline{RI}$, $\overline{ORIG}$ all HI) and, if appropriate, lights the Message Waiting Lamp.

What is claimed is:

1. A system for telephone answering service (TAS) comprising:
    a plurality of customer stations each having access to first and second telephone lines; and
    a TAS station comprising:
    (a) TAS storage and control means;
    (b) at least one TAS operator position;
    (c) at least two incoming telephone lines dedicated to an associated operator position;
    (d) switch means for selectively connecting one of said two incoming telephone lines to the associated operator position and to interface means with said TAS storage and control means;
    (e) display means at said TAS operator position responsive to said TAS storage and control means for displaying answering phrases stored in customer stations and relayed over said second telephone lines to said TAS storage and control means; and
    (f) all said incoming telephone lines being lines of the TAS station's public telephone exchange accessible by means of a single telephone number assigned said TAS station.

2. The system as defined in claim 1, each of said plurality of customer stations comprising:
    (i) local storage and control means for storing an answering phrase;
    (ii) a modem responsive to said local storage and control means for relaying said answering phrase to said TAS station over said second telephone line;
    (iii) a ringing detector connected to said first telephone line;
    (iv) interconnect means responsive to said local storage and control means for establishing at least a voice band connection between said first and second telephone lines in response to ringing on said first line and an off-hook state at the TAS operator position; and
    (v) data entry means for instructing said local storage and control means.

3. The system as defined in claim 2, said TAS station further comprising a modem for receiving said answering phrases relayed over the second telephone line and for transmitting thereon a predetermined message to the customer station.

4. The system as defined in claim 3, comprising a plurality of TAS stations.

5. The system as defined in claim 3, said TAS storage and control means being a microprocessor and associated memories.

6. The system as defined in claim 2 or 3, said local storage and control means being a microprocessor and associated memories.

7. The system as defined in claim 4, said TAS storage and control means and said local storage and control means each being a microprocessor and associated memories.

* * * * *